United States Patent
Still

(10) Patent No.: US 9,588,914 B2
(45) Date of Patent: *Mar. 7, 2017

(54) BROADCAST AND UNICAST COMMUNICATION BETWEEN NON-COHERENT PROCESSORS USING COHERENT ADDRESS OPERATIONS

(71) Applicant: International Business Machines Corporation, Armonk, NY (US)

(72) Inventor: Gregory S. Still, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 87 days.

This patent is subject to a terminal disclaimer.

(21) Appl. No.: 14/248,653

(22) Filed: Apr. 9, 2014

(65) Prior Publication Data
US 2015/0293844 A1    Oct. 15, 2015

(51) Int. Cl.
| G06F 13/12 | (2006.01) |
| G06F 13/16 | (2006.01) |
| G06F 12/10 | (2016.01) |
| G06F 13/42 | (2006.01) |
| G06F 12/08 | (2016.01) |

(52) U.S. Cl.
CPC ...... *G06F 13/1673* (2013.01); *G06F 12/0837* (2013.01); *G06F 12/1072* (2013.01); *G06F 13/4221* (2013.01); *G06F 2212/657* (2013.01)

(58) Field of Classification Search
None
See application file for complete search history.

(56) References Cited

U.S. PATENT DOCUMENTS

| 4,306,298 A | 12/1981 | McElroy |
| 4,626,985 A | 12/1986 | Briggs |
| 5,237,567 A | 8/1993 | Nay et al. |
| 5,490,253 A | 2/1996 | Laha et al. |
| 5,734,849 A * | 3/1998 | Butcher ................ 710/305 |
| 6,370,668 B1 * | 4/2002 | Garrett, Jr. .......... G06F 11/1028 714/710 |
| 2008/0028176 A1 * | 1/2008 | Bartley et al. ............. 711/167 |

OTHER PUBLICATIONS

Andrew S. Tanenbaum, Structured computer organization, 1984, 2nd ed., pp. 1-5.*

* cited by examiner

*Primary Examiner* — Henry Tsai
*Assistant Examiner* — Dean Phan
(74) *Attorney, Agent, or Firm* — DeLizio Law, PLLC

(57) ABSTRACT

Non-address data is received for transmission on a non-transitory communication medium communicably coupling a plurality of devices, wherein the communication medium includes an address component and a data transport component separate from the address component. At least a portion of the non-address data is inserted into a portion of an address command. An indicator is set in the address command to notify a receiver that the information received in the address command over the address component is not associated with a memory address. The address command containing the non-address data is then sent over the address component of the communication medium.

11 Claims, 8 Drawing Sheets

US 9,588,914 B2

BROADCAST AND UNICAST COMMUNICATION BETWEEN NON-COHERENT PROCESSORS USING COHERENT ADDRESS OPERATIONS

BACKGROUND

Embodiments of the inventive subject matter generally relate to the field of computer communications, and, more particularly, to broadcast and unicast communication between non-coherent processors using coherent address operations.

For the purposes of doing real-time server monitoring (thermals, power, performance, etc.), intelligent on-chip micro-controllers can be implemented into a multi-core processor chip that is part of a multi-chip symmetric multiprocessing (SMP) system so that localized monitoring of a given chip can occur. SMP systems typically have an interconnect (referred to as a "fabric") that connects the main processing cores and caches together in a memory coherent manner. Participation in the cache coherent protocols on such a fabric is expensive in the silicon resource needed for an otherwise small micro-controller. In a addition, a typical premise of a coherent fabric is to track the movement of memory blocks between the attached caches. A coherent typically doesn't support the concept of broadcasting data elements from one location to many in that fabric

SUMMARY

System and computer program product embodiments include receiving non-address data to be transmitted on a non-transitory communication medium communicably coupling a plurality of devices, wherein the communication medium includes an address component and a data transport component separate from the address component. At least a portion of the non-address data is inserted into a portion of an address command. An indicator is set in the address command to notify a receiver that the information received in the address command over the address component is not associated with a memory address. The address command containing the non-address data is then sent over the address component of the communication medium.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes example systems, methods, techniques, instruction sequences and computer program products that embody techniques of the present inventive subject matter. However, it is understood that the described embodiments may be practiced without these specific details. For instance, although examples refer to a communication fabric that provides communications capability between processors and processor components in a system, the inventive subject matter may be applied to various types of bus architectures. In other instances, well-known instruction instances, protocols, structures and techniques have not been shown in detail in order not to obfuscate the description.

Generally speaking, the embodiments provide a mechanism for broadcasting non-coherent messages (including movement of non-address data) that are interleaved with coherent traffic in a fabric that doesn't natively allow for data broadcast.

Figure 1:
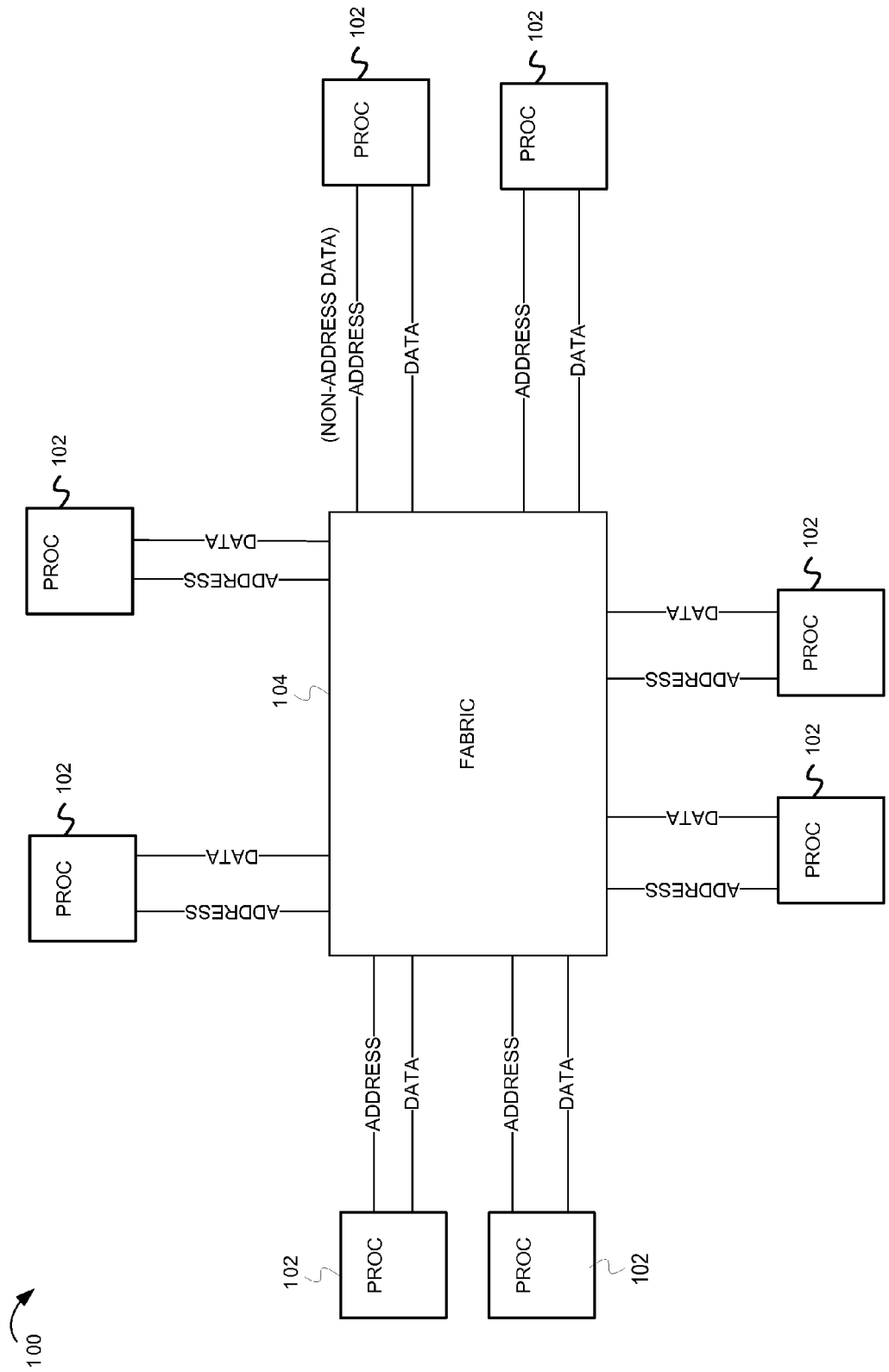
FIG. 1 is a block diagram illustrating a system according to embodiments.

FIG. 1 is a block diagram illustrating a system 100 according to embodiments. System 100 includes multiple processors 102 coupled to a communications fabric 104. Communications fabric 104 manages communications between processors 102 in system 100. In some embodiments, communications fabric 104 is the PowerBus from IBM Corp. As shown in FIG. 1, communication fabric 104 provides separate components for address information and data transport. In some implementations, address information can be broadcast from one processor 102 to the other processors coupled to fabric 104, while data transport is limited to point to point communication between two processors 102 coupled to communication fabric 104. As an example, processors 102 may utilize fabric 104 to maintain memory coherency in a memory subsystem that is shared by processors 102. In such implementations, address information may be broadcast from a first processor 102 to all other processors 102 coupled to fabric 104 in order to request data stored at a requested address from the processor having the freshest copy of the data stored in a processor cache line associated with the address. A requesting processor 102 requests data for an address by broadcasting the request over the address component to the other processors coupled to fabric 104. A responding processor 102 having the freshest copy of the data in a cache line responds to the broadcast. A point-to-point connection is then used to transport the requested data from the responding processor 102 to the requesting processor 102 over the data transport component of fabric 104. The use of a point-to-point connection for data transport can be desirable to avoid clogging fabric 104 with data transports.

Although the above-described system can efficiently provide for memory coherency for a shared memory system, there may be times when a point-to-point communication of data is not desirable. For instance, it is often desirable to communicate non-address data from one processor or processor component to other processor or processor components coupled to fabric 104. Power consumption data, thermal data, or performance data are all examples of types of non-address data that may be desirable to broadcast between components coupled to fabric 104. Those of skill in the art having the benefit of the disclosure will appreciate that other examples of broadcast data exist and are within the scope of the inventive subject matter. Thus the inventive subject matter includes a mechanism to utilize the address component of communications fabric 104 to broadcast non-address data to multiple processors 102 on communication fabric 104. Further details on the operation of embodiments are described below.

Figure 2:
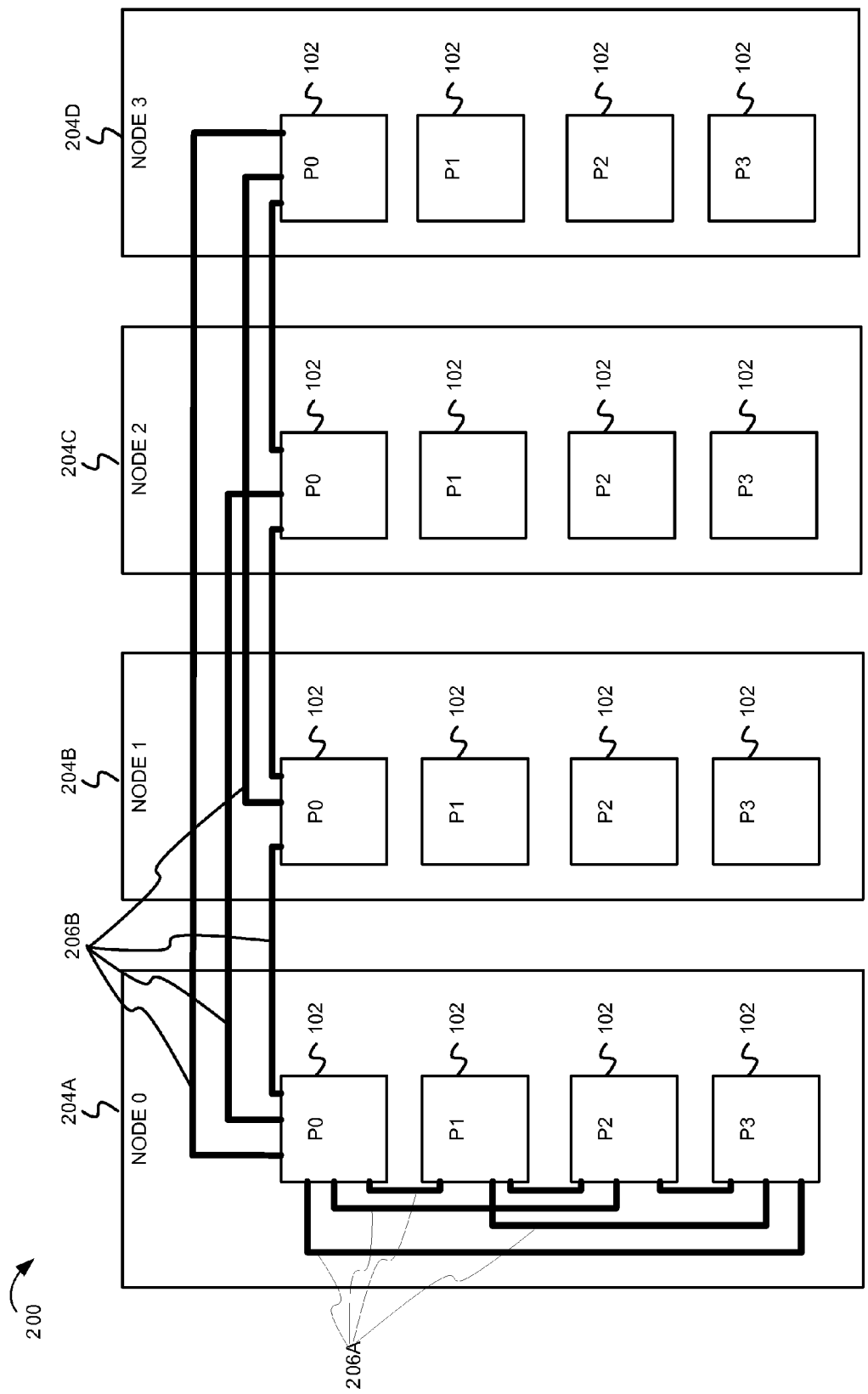
FIG. 2 is a block diagram illustrating a fabric topology according to embodiments.

FIG. 2 is a block diagram illustrating an example fabric topology 200 according to embodiments. In some embodiments, example fabric topology 200 includes nodes 204 communicably coupled on fabric 104 using fabric connections 206A and 206B. Each node 204 may be referred to as a "drawer" and may include multiple processors 102. In some embodiments, processors 102 are individually mounted on node 204. Processors 102 mounted on node 204 may be communicably coupled via fabric connections 206A that provide intra-node connections between processors P0-P3 on node 204. Connections similar to 206A may provide intra-node coupling for processors P0-P3 on some or all of nodes 204B-204C. Such connections have been omitted from FIG. 2 to avoid obscuring details in the Figure. Inter-node communications may be provided via fabric connections 206B. In some embodiments, fabric connections 206B can be provided by a cable coupling processors in nodes 204 with one another. As illustrated in FIG. 2, a processor in one node is communicably coupled with corresponding processors in other nodes. For example, in some embodiments, processor P0 in node 204A is communicably coupled with corresponding processor P0's in nodes 204B, 204C and 204D. Although not shown, similar connections may couple corresponding P1, P2 and P3 processors across nodes 204A-204D. In some embodiments, a processor having one rank in a node (e.g., processor P0) is not connected to processors of a different rank (e.g., processors P1, P2, or P3). In such implementations, a processor 102 in one node that is to communicate with a processor 102 in a different node having a different rank transmits the communication to the processor having the corresponding rank in the different node which then forwards the communication to the appropriate processor. To illustrate, if processor P0 in node 204A wants to communicate with processor P3 of node 204C, the communication is sent from processor P0 in node 204A to corresponding processor P0 of node 204C, which forwards the communication to processor P3 of node 204C.

It should be noted that although the example topology 200 provided in FIG. 2 shows four nodes 204 and four processors 102 in each node, that other implementations may have more or fewer nodes and more or fewer processors in each node. The embodiments are not limited to any particular number of nodes or processors.

Figure 3:
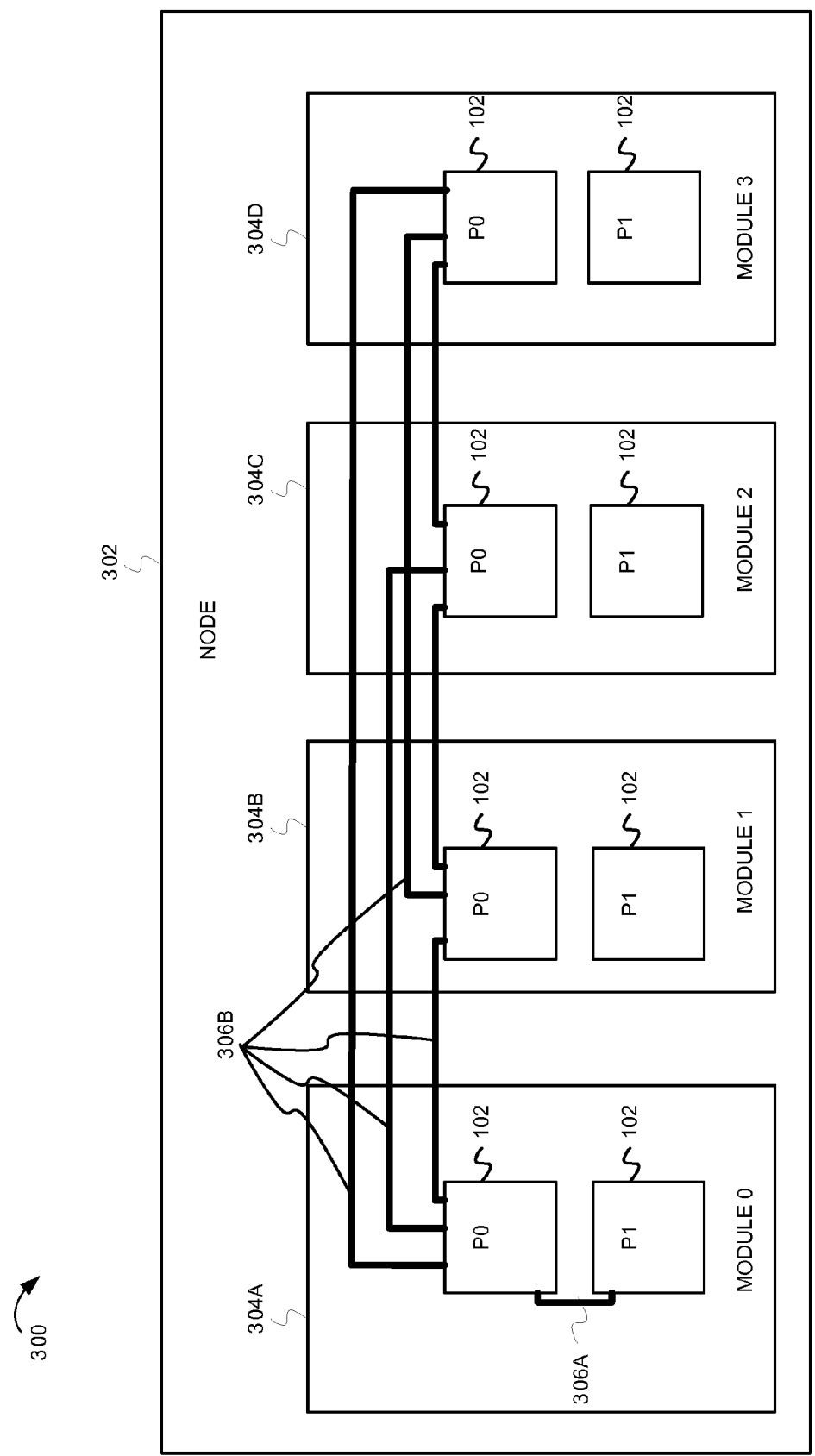
FIG. 3 is a block diagram illustrating a fabric topology according to alternative embodiments.

FIG. 3 is a block diagram illustrating an example fabric topology 300 according to alternative embodiments. Example topology 300 includes a node 302 having four processor packages 304A-304D. Each package 304 includes two processors 102. In example topology 300, fabric 104 includes connections 306A and 306B. Connections 306A communicably couple processors 102 in a package 304, thereby provided intra-package connectivity between processors 102 in a package 304. Although not shown in FIG. 3, connections similar to connection 306A may communicably couple processors P0 and P1 in each of nodes 304B-404D. Connections 306B communicably couple processors P0 across packages 304A-404D thereby providing inter-package connectivity between processors in different packages 304. Although not shown in FIG. 3, a connection similar to 306B may couple processors P1 across nodes 306A-306D. As illustrated in FIG. 3, a processor in one package is communicably coupled with corresponding processors in other packages. For example, in some embodiments, processor P0 in package 304A is communicably coupled with corresponding processor P0's in packages 304B, 304C and 304D. Although not shown, similar connections may couple corresponding P1 processors across packages 304A-404D. In some embodiments, a processor having one rank in a node (e.g., processor P0) is not connected to processors of a different rank (e.g., processors P1). In such implementations, a processor 102 in one package that is to communicate with a processor 102 in a different package having a different rank transmits the communication to the processor having the corresponding rank in the different package which then forwards the communication to the appropriate processor. To illustrate, if processor P0 in package 304A wants to communicate with processor P1 of package 304D, the communication is sent from processor P0 in package 304A to corresponding processor P0 of package 304D, which forwards the communication to processor P1 of package 304D.

It should be noted that although the example topology 300 provided in FIG. 3 shows four packages 304 and two processors 102 in each package, that other implementations may have more or fewer packages in a node and more or fewer processors in each package. The embodiments are not limited to any particular number of packages or processors.

Figure 4:
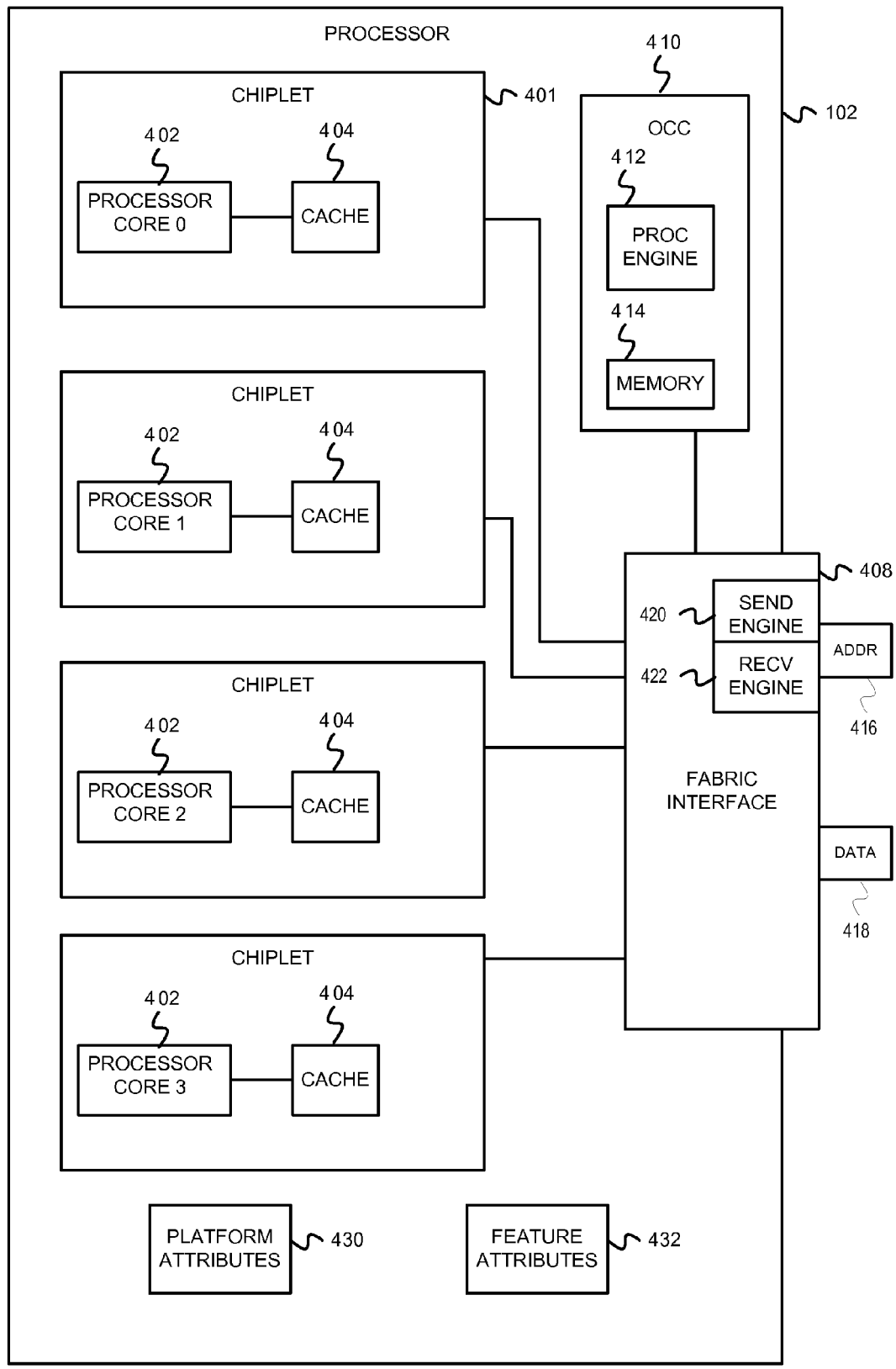
FIG. 4 is a block diagram illustrating a multi-core processor according to embodiments.

FIG. 4 is a block diagram illustrating a processor 102 according to embodiments. In some embodiments, processor 102 is a multi-core processor having multiple chiplets 401. Chiplets 401 include a processor core 402 and may include cache memory 404. The cache memory 404 may comprise any of L1, L2 and/or L3 cache memories.

Processor 102 also includes an on-chip controller (OCC) 410. OCC 410 may provide various monitoring and control functions for processor 102. For example, OCC 410 may monitor and control power usage of chiplets 401. Additionally, OCC 410 may monitor and control thermal or performance parameters associated with chiplets 401. In some embodiments, OCC 410 includes a processing engine 412 and memory 414. Processing engine 412 comprises logic that executes firmware that may be stored in memory 414 that implements code to perform the monitoring and control functions performed by OCC 410.

Processor 102 includes a fabric interface 408. Fabric interface 408 provides an interface between components of processor 102 (e.g., processor core 402, OCC 410 etc.) and fabric 104 such that the components of processor 102 can communicate with other processors and devices coupled to fabric 104. Fabric interface 408 includes an address component 416 and a data component 418. In some embodiments, address component 416 supports broadcast functionality such that an address related command may be broadcast from one component coupled through fabric 104 to another component coupled through fabric 104. In some embodiments, data transport component 418 provides a point-to-point communication capability allowing two components coupled through fabric 104 to communicate with one another. Fabric interface 408 can include send engine 420 and receive engine 422. Send engine manages processing of commands that are to be sent by a component of processor 102 to other components coupled through the address component 416 of fabric 104. Receive engine 422 manages processing of commands received through address component 416 of fabric 104. Although not shown, fabric interface 408 may include various registers used to control the operation of the interface and send and receive engines 420 and 422.

Processor 102 can include platform attributes 430. In some embodiments, platform attributes 430 can include a node identifier, chip identifier and a broadcast identifier vector. A node identifier uniquely identifies a node within a system, where a node can include one or more processors 102. An example of a node is provided below with respect to FIGS. 3 and 4. A chip identifier uniquely identifies a processor 102 chip within a node. A broadcast vector defines one or more groups in a topology overlaid on fabric 104 to which a processor 102 chip belongs. In some embodiments, the vector is a bit vector, with a bit indicating whether the processor 102 belongs to the indicated group.

Processor 102 can include feature attributes 432. Feature attributes can include various parameters such as timeout values for receiving acknowledgments of commands sent over address component 416, and retry counts specifying the number of times a send engine will retry sending a command over address component 416.

Figure 5:
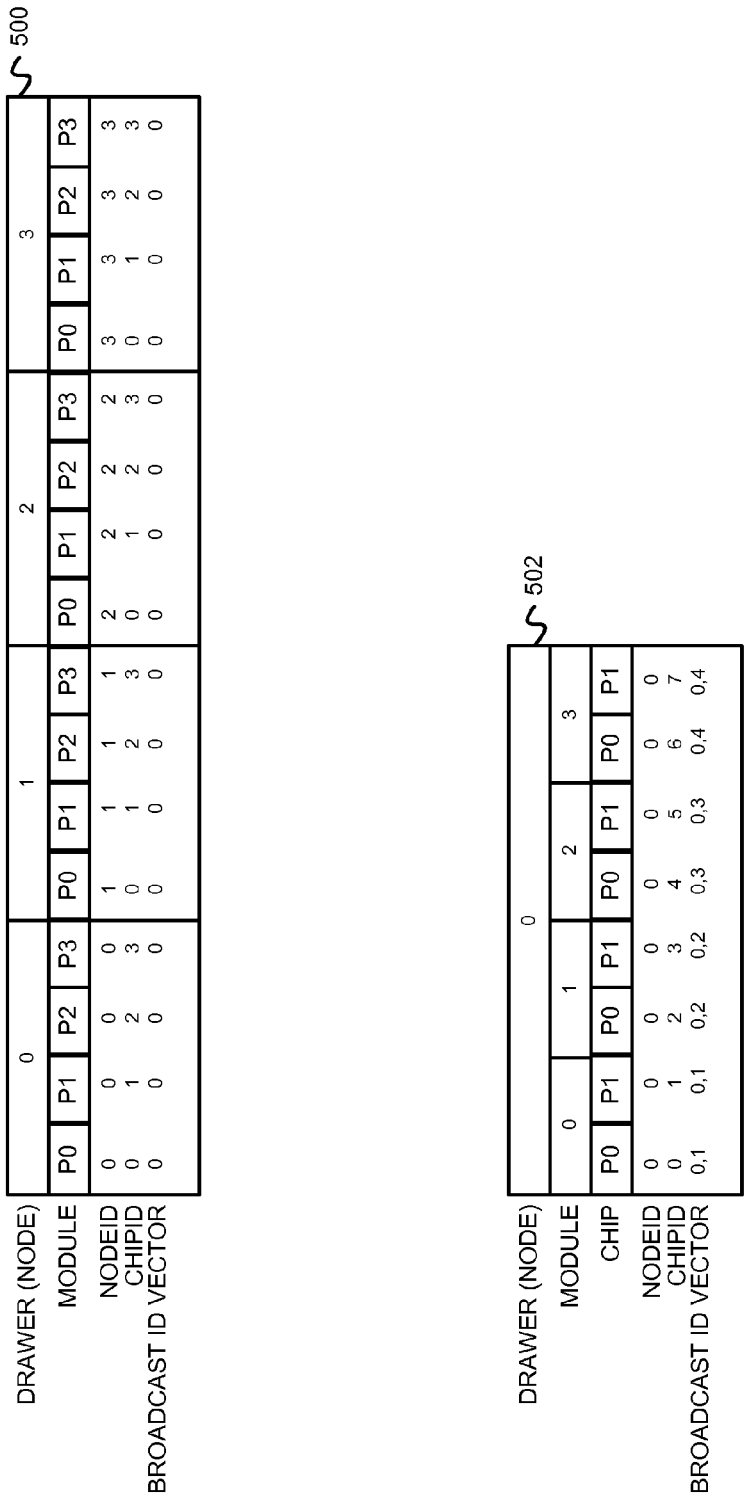
FIG. 5 illustrates tables providing example platform attribute values for the example topographies of FIGS. 2 and 3.

FIG. 5 illustrates two tables providing example platform attribute values for the example topographies of FIGS. 2 and 3. Table 500 illustrates an example set of platform attribute values for processors on nodes corresponding to topology 200 (FIG. 2). The platform attribute values NODEID, CHIPID and BROADCAST ID VECTOR are set as indicated in table 500 for the processors in topology 200. In the example table 500, a single broadcast group (default group "0") is present. All processors are members of this group, thus all processors will receive data that is broadcast over an address component of fabric 104.

Table 502 illustrates an example set of platform attribute values for processors in a topology corresponding to topology 300 (FIG. 3). The platform attribute values NODEID, CHIPID and BROADCAST ID VECTOR are set as indicated in table 502 for the processors in topology 300. In the example table 502, multiple broadcast groups are present. All processors in topology 300 are members of group 0. Because all processors are members of this group, they will receive data that is broadcast for group 0 over an address component of fabric 104. In addition, separate broadcast groups have been defined for each module (package) 304 in topology 300. As shown in table 502, processors P0 and P1 in module 304A are members of group 1, processors P0 and P1 in module 304B are members of group 2, processors P0 and P1 in module 304C are members of group 3, and processors P0 and P1 in module 304D are members of group 4. Thus a broadcast to group 3 will be received and processed by processors P0 and P1 on module 304C. The broadcast data may be received on processors of other modules, but will be ignored by the processors on the modules other than module 304C.

Figure 6:
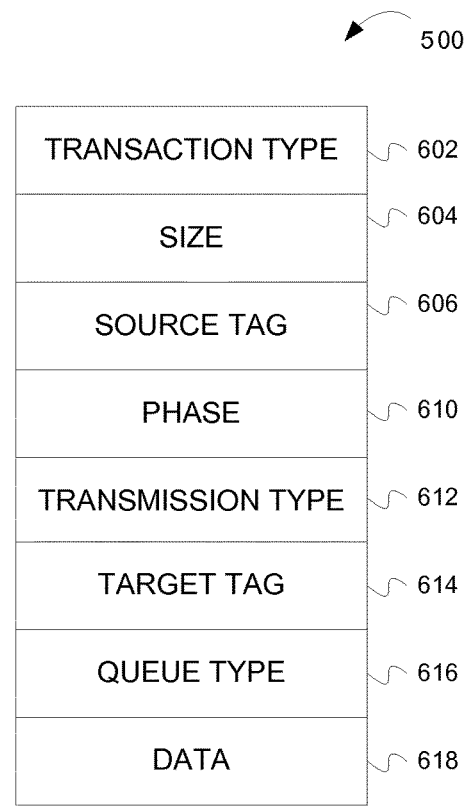
FIG. 6 is a block diagram illustrating an address command according to embodiments.

FIG. 6 is a block diagram illustrating an address command according to embodiments. In some embodiments, address commands broadcast over an address component of a communication medium such as a fabric are used to broadcast data to multiple recipients on the communication medium. In some implementations, the address command includes a transaction type 602, size 604, source tag 606, phase 610, transmission type 612, target tag 614, queue type 616 and data 618.

Transaction type 602 indicates the type of address command. Fabric interface 408 may support a number of different types of address commands. For example, an address command may be a cache command, an address access command, or management command. Transaction type 602 is used to specify the command. In some embodiments, a "PMISC" PowerBus command is used to broadcast data over fabric 104.

Size field 604 may be used to indicate the size of the command. In some embodiments, the size field is used for a different purpose, that is, to indicate that the address command is being used to transport non-address data. A value that may be invalid when interpreted as a command size may be used to indicate to fabric interface 408 that the command is being used to transport non-address data.

Source tag 606 identifies a source of the command. The source command may be used to indicate a component coupled to fabric 104 that is providing the non-address data. In some embodiments, the source tag includes a node identifier, a chip identifier and a unit identifier. The chip identifier identifies a processor that is the source of the data. The unit identifier can be used to identify a component of the chip that is the source of the non-address data. The component can be OCC 410 or a processor core on chiplet 401. The node identifier specifies the node where the chip that is the source of the data resides.

Target tag 614 identifies a target that is to receive and process the command. In some embodiments, the target data includes a node identifier and a chip identifier. The data can be targeted to an OCC 410 on the target chip (processor). In alternative embodiments, the target tag 614 may include data such as a unit identifier that can be used to identify a particular component on a target chip.

Phase 610 identifies a phase of the transmission of the non-address data. In some embodiments, address component 416 is designed to operate in a 64 bit address space. However, address component 416 may be designed to transport address commands having lower bit size. Thus addresses are specified in two phases, with a portion of an address transmitted during a first phase and a remaining portion of an address transmitted in a second phase. The phase value specifies which of the two phases is currently in use. Similarly, the non-address data may be transmitted in two phases, where a first portion of the non-address data is transmitted in the first phase and second portion of the non-address data is transported in the second phase.

Transmission type 612 indicates whether the non-address data is to be broadcast on fabric 104 or if it is to be unicast to a particular target identified using target tag 614. If transmission type 612 indicates that the data is to be broadcast, a receiving fabric interface will provide the data to OCC 410 regardless of the values in target tag 614. If transmission type 612 indicates that the data is to be unicast, then a receiving fabric interface 408 will provide the data to an OCC 410 only if the node identifier and chip identifier in the target tag data matches the corresponding identifiers in the chips platform attributes.

Queue type 616, if present, specifies a queue type for processing the non-address data. In some embodiments, the queue type may specify a "sync" queue, in which the data is routed to an OCC 410 for immediate processing. Additionally, the queue type 616 may specify a "doorbell" queue, in which the data is sent to a target, but the data is held for processing until a subsequent address command indicates that the data is to be released for processing.

Data 618 comprises the non-address data to be sent over the address component of the communication medium. As noted above, the non-address data may be divided into two or more portions for transmission using multiple address commands.

Figure 7:
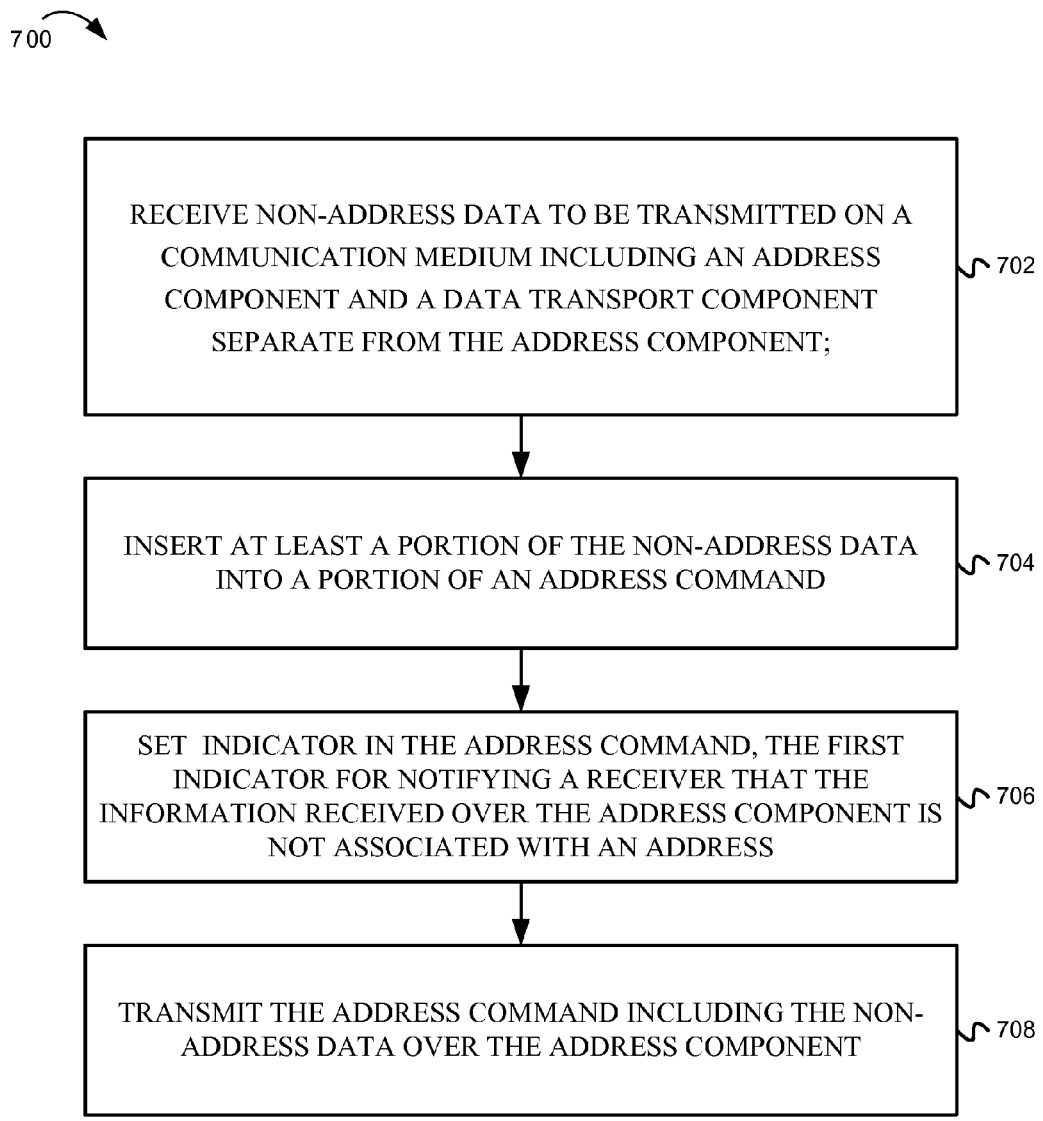
FIG. 7 is a flowchart illustrating a method for transmitting non-address data over an address component of a communication medium according to embodiments.

FIG. 7 is a flowchart illustrating a method 700 for transmitting data on an address component according to embodiments. Method 700 begins at block 702, with receiving non-address data to be transmitted on an address component of a communication medium having an address component and a data transport component separate from the address component. In some embodiments, the non-address data may be received by fabric interface 408 from OCC 410. The non-address data may include data related to power usage on a processor, thermal data for a processor, or performance data for a processor. The embodiments are not limited to any particular type of non-address data.

At block 704, the non-address data is inserted into a portion of an address command.

At block 706, an indicator is set in the address command to specify that the address command is transporting non-address data for routing to a component of a processor. For example, the non-address data may be routed by a receiving fabric interface 408 to an OCC 410 on the receiving processor.

At block 708, the address command is transmitted over the address component of the communication medium. As noted above, the non-address data may be divided into portions and transmitted using multiple address commands and multiple phases. In some embodiments, the non-address data may be eight bytes of data and an address command used to transport four bytes of data at a time, thereby using two address commands (and two phases) to transport the full eight bytes of non-address data over the address component of the communication medium. Those of skill in the art having the benefit of the disclosure will appreciate that other sizes of non-address data and command data sizes may be used and are within the scope of the inventive subject matter.

After transmission of the non-address data over the address component, a fabric interface may determine if the target processor or processors have acknowledged receipt of the non-address data. In some embodiments, a combined response is received. The combined response can indicate all of the target processors have received the non-address data. In those embodiments employing a multi-phased transport of the non-address data, a combined response may be received for each phase. The operation can be considered completed when both phases have been acknowledged in the combined response.

In the case of operations that are not completed, the operations can be retried. The operations may not be completed because of an error in the transmission, or because the fabric interface is busy processing or responding to other commands. The number of times an operation will be retried may be specified in the platform features data 432.

Figure 8:
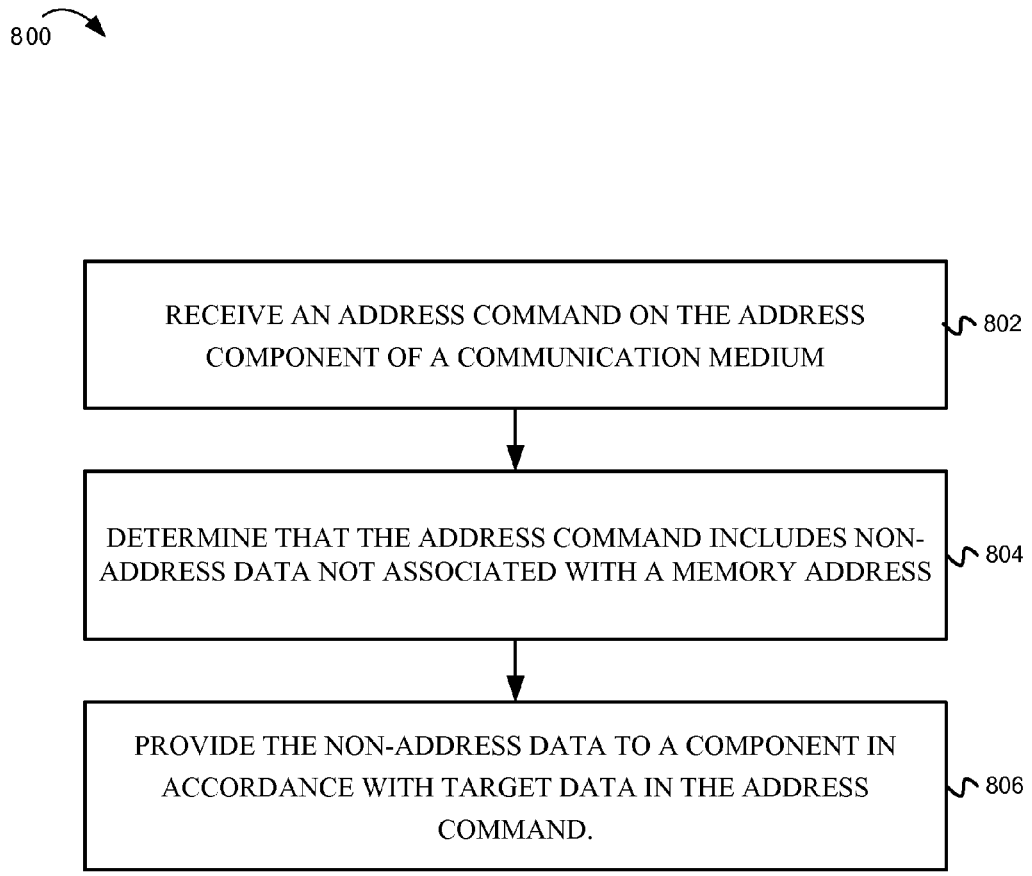
FIG. 8 is a flowchart illustrating a method for receiving non-address data over an address component of a communication medium.

FIG. 8 is a flowchart illustrating a method 800 for receiving a transmission of non-address data over an address component of a communication medium. Method 800 begins at block 802 by receiving an address command on an address component of a communication medium. For example, a fabric interface 408 may receive an address command over address component 416 of fabric 104.

At block 804, the fabric interface 408 can determine that the address command includes non-address data (e.g., data that is not related to an address or memory subsystem command). In some embodiments, a field of the address command may be used to indicate that the address command is being used to transport non-address data. As noted above, in particular implementations, a size field of a PMISC PowerBus command is used to indicate that the command is being used to transport non-address data.

At block 806, in response to determining that the address command is being used to transport non-address data, the fabric interface 408 can provide the non-address data to a component in accordance with the target data and other fields of the address command. The fabric interface 408 can determine if the non-address data is targeted to the processor incorporating the fabric interface. If the non-address data is not targeted to the processor incorporating the fabric interface, the fabric interface can ignore the command. The fabric interface 408 can make the determination in several ways. In the case that the address command indicates that the address command is a unicast transmission, the fabric interface can compare the node identifier and chip identifier in the target field of the address command with corresponding attributes in the platform data for the processor. If the attributes match, then the fabric interface 408 provides the non-address data to a component of the processor, for example, OCC 410. If the attributes do not match, then the fabric interface can ignore the command. If the address command indicates that it is a broadcast transmission, then the fabric interface 408 can ignore the node identifier and chip identifier and provide the non-address data to a component of the process, for example, OCC 410. In some embodiments, fabric 408 provides the non-address data to OCC 410 by storing the non-address data in a queue in memory accessible to OCC 410.

As noted above, data transmissions of non-address data may occur in two phases. In such implementations, fabric 408 may detect that it has received the first portion of the non-address data in a first phase of the transmission in a first address command. Fabric 408 may then store the first portion of the non-address data along with the source tag indicating where the data came from. Upon receiving the second portion of the non-address data in a second address command, fabric 408 can compare the stored source tag with the source tag in the second address command to determine if the address command contains the second portion corresponding to the previously received first portion of the non-address data. If so, the two portions of the non-address data may be combined and provided to OCC 410.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "component", "module" or "system." Furthermore, aspects of the present inventive subject matter may take the form of a program product embodied in one or more machine readable medium(s) having machine readable program code embodied thereon.

Any combination of one or more machine readable medium(s) may be utilized. The machine readable medium may be a machine readable signal medium or a machine readable storage medium. A machine readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the machine readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device.

A machine readable signal medium may include a propagated data signal with machine readable program code embodied therein, for example, in baseband or as part of a carrier wave. Such a propagated signal may take any of a variety of forms, including, but not limited to, electro-magnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a machine readable medium that can direct a computer, other programmable data processing apparatus, or other devices to function in a particular manner, such that the instructions stored in the machine readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for transmission of non-address data over an address component of a communication medium as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer program product for transmission of non-address data over an address bus of a communication medium, the computer program product comprising:
   a machine readable storage medium having machine usable program code embodied therewith, the machine usable program code comprising a machine usable program code configured to:
   receive non-address data to be transmitted on a non-transitory communication medium communicably coupling an interface to a plurality of devices, wherein the non-transitory communication medium includes an address bus and a data transport bus separate from the address bus;
   insert a first portion of the non-address data into a portion of a first address command having a plurality of fields during a first phase of communication over the address bus;
   set a first indicator in a first field of the first address command, the first indicator for notifying a receiver that information received in the first address command over the address bus is not memory address data;
   set a second field of the first address command to a second indicator to indicate the first phase of communication that the first portion of the non-address data is communicated over the address bus; and
   transmit the first address command over the address bus.

2. The computer program product of claim 1, wherein the machine usable program code further includes machine usable program code configured to:
   insert a second portion of the non-address data into a second address command for transmission during a second phase of communication over the address bus;
   set the second field of the second address command to a third indicator to indicate that the second portion of the non-address data is communicated during the second phase of communication of over the address bus; and
   transmit the second address command over the address bus.

3. The computer program product of claim 2, wherein the machine usable program code is further configured to determine that transmission of the data is complete in response to receiving an acknowledgement of receipt of the first address command and an acknowledgement of receipt of the second address command.

4. The computer program product of claim 1, wherein the plurality of devices includes one or more on-chip controllers.

5. The computer program product of claim 1, wherein the machine usable program code is further configured to:
   receive a third address command on the address bus of the non-transitory communication medium;
   determine that the third address command includes second non-address data not associated with a memory address; and
   in response to the determination that the third address command includes second non-address data, provide the second non-address data to a component in accordance with target data in the third address command.

6. An apparatus comprising:
   a non-transitory communication medium; and
   an interface coupled to the non-transitory communication medium, the interface configured to:
   receive non-address data to be transmitted on the non-transitory communication medium, the non-transitory communication medium communicably coupling the interface to a plurality of devices, wherein the non-transitory communication medium includes an address bus and a data transport bus separate from the address bus;
   insert a first portion of the non-address data into a portion of a first address command having a plurality of fields during a first phase of communication over the address bus;
   set a first indicator in a first field of the first address command, the first indicator for notifying a receiver that information received in the first address command over the address bus is not memory address data;
   set a second field of the first address command to a second indicator to indicate the first phase of communication that the first portion of the non-address data is communicated over the address bus; and
   transmit the first address command over the address bus.

7. The apparatus of claim 6, wherein the interface is further configured to:
   insert a second portion of the non-address data into a second address command for transmission during a second phase of communication over the address bus;
   set the second field of the second address command to a third indicator to indicate that the second portion of the non-address data is communicated during the second phase of communication of over the address bus; and
   transmit the second address command over the address bus.

8. The apparatus of claim 7, wherein the interface is further configured to determine that transmission of the data is complete in response to receiving an acknowledgement of receipt of the first address command and an acknowledgement of receipt of the second address command.

9. The apparatus of claim 6, wherein the plurality of devices includes one or more on-chip controllers.

10. The apparatus of claim 6, wherein the interface is further configured to:
    receive a third address command on the address bus of the non-transitory communication medium;
    determine that the third address command includes second non-address data not associated with a memory address; and
    in response to the determination that the third address command includes second non-address data, provide the second non-address data to a component in accordance with target data in the third address command.

11. The apparatus of claim 6, wherein the non-transitory communication medium comprises a communication fabric.

* * * * *